(12) United States Patent
Bachinski

(10) Patent No.: US 6,591,696 B2
(45) Date of Patent: Jul. 15, 2003

(54) INTEGRAL ELECTRIC PRESSURE PROBE FOR AIRCRAFT

(75) Inventor: Thomas J Bachinski, Lakeville, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 0 days.

(21) Appl. No.: 09/904,400

(22) Filed: Jul. 12, 2001

(65) Prior Publication Data

US 2003/0010130 A1 Jan. 16, 2003

(51) Int. Cl.⁷ ................................................ G01F 1/46
(52) U.S. Cl. ............................. 73/861.65; 73/861.66; 73/861.67; 73/747
(58) Field of Search ............................... 73/747, 861.68, 73/861.66, 182, 861.65, 710, 170.02, 861.67; 62/51.2

(56) References Cited

U.S. PATENT DOCUMENTS

| | | | | |
|---|---|---|---|---|
| 2,992,313 A | * | 7/1961 | Taylor | |
| 4,275,603 A | * | 6/1981 | Kalocsay | 73/861.68 |
| 4,350,314 A | * | 9/1982 | Hoadley | 244/1 R |
| 4,836,019 A | | 6/1989 | Hagen et al. | |
| 5,025,661 A | * | 6/1991 | McCormack | 73/180 |
| 5,601,254 A | * | 2/1997 | Ortiz et al. | 73/780 |
| 5,731,507 A | * | 3/1998 | Hagen et al. | 73/182 |
| 5,992,158 A | * | 11/1999 | Goddard et al. | 62/51.2 |
| 6,134,972 A | * | 10/2000 | Streckert et al. | 73/861.65 |
| 6,271,769 B1 | * | 8/2001 | Frantz | 340/963 |

FOREIGN PATENT DOCUMENTS

WO    WO 9508122 A    3/1995

OTHER PUBLICATIONS

BFGoodrich Aircraft Sensors Multi–Function SmartProbe, Rosemount Aerospace; SS 3082 May 2000.

* cited by examiner

*Primary Examiner*—Hezron Williams
*Assistant Examiner*—Alandra N. Ellington
(74) *Attorney, Agent, or Firm*—James M. Rashid; Calfee, Halter & Griswold LLP

(57) ABSTRACT

An electric pressure probe for an aircraft comprises: a pitot tube assembly for collecting pneumatically air pressure in the vicinity of the assembly; a strut including one end mountable to a surface of the aircraft, the pitot tube assembly being coupled to another end of the strut for being supported away from the aircraft surface; a pressure sensor integral to the strut and pneumatically coupled to the pitot tube assembly for converting the pneumatic pressure collected thereby to an electrical pressure signal; and circuitry integral to the strut and coupled to the pressure sensor for signal conditioning the electrical pressure signal, the circuitry including at least one output lead for conducting the conditioned electrical signal from the probe. A method of making an integral electric pressure probe comprises the steps of: coupling one end of a housing to a pitot tube assembly; molding a moldable material into the form of a strut including one end for being mounted to a surface of an aircraft; and molding another end of the housing to another end of the strut.

17 Claims, 2 Drawing Sheets

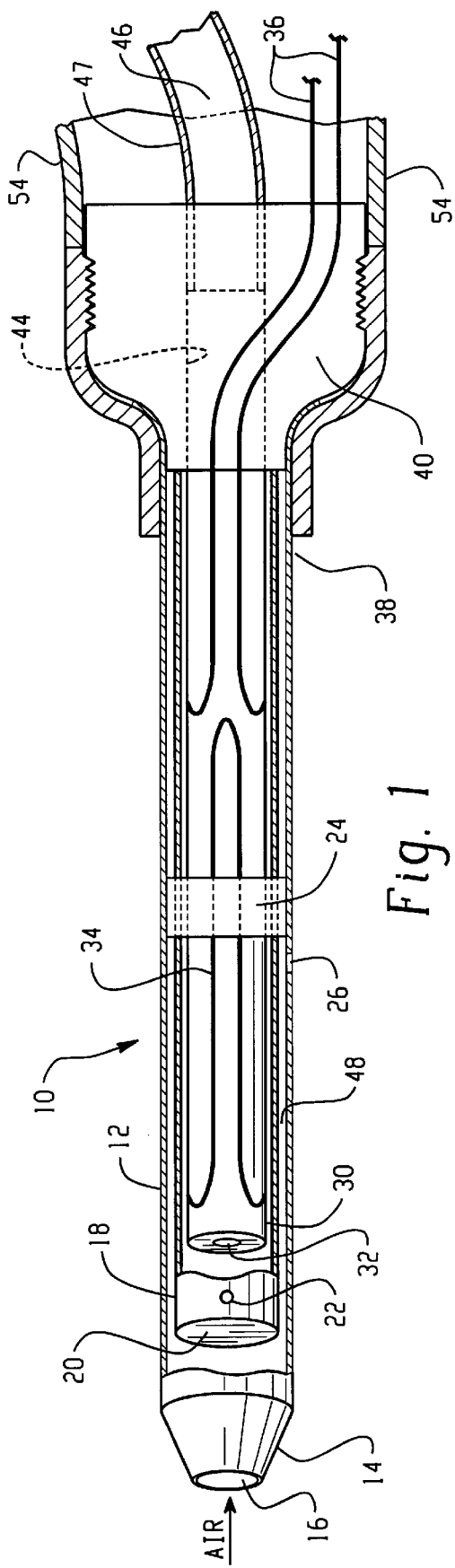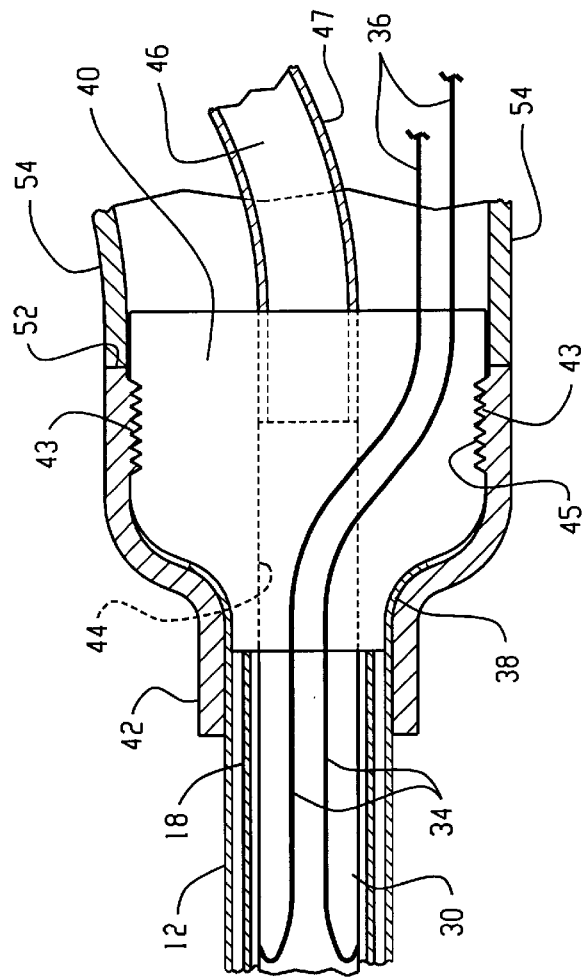

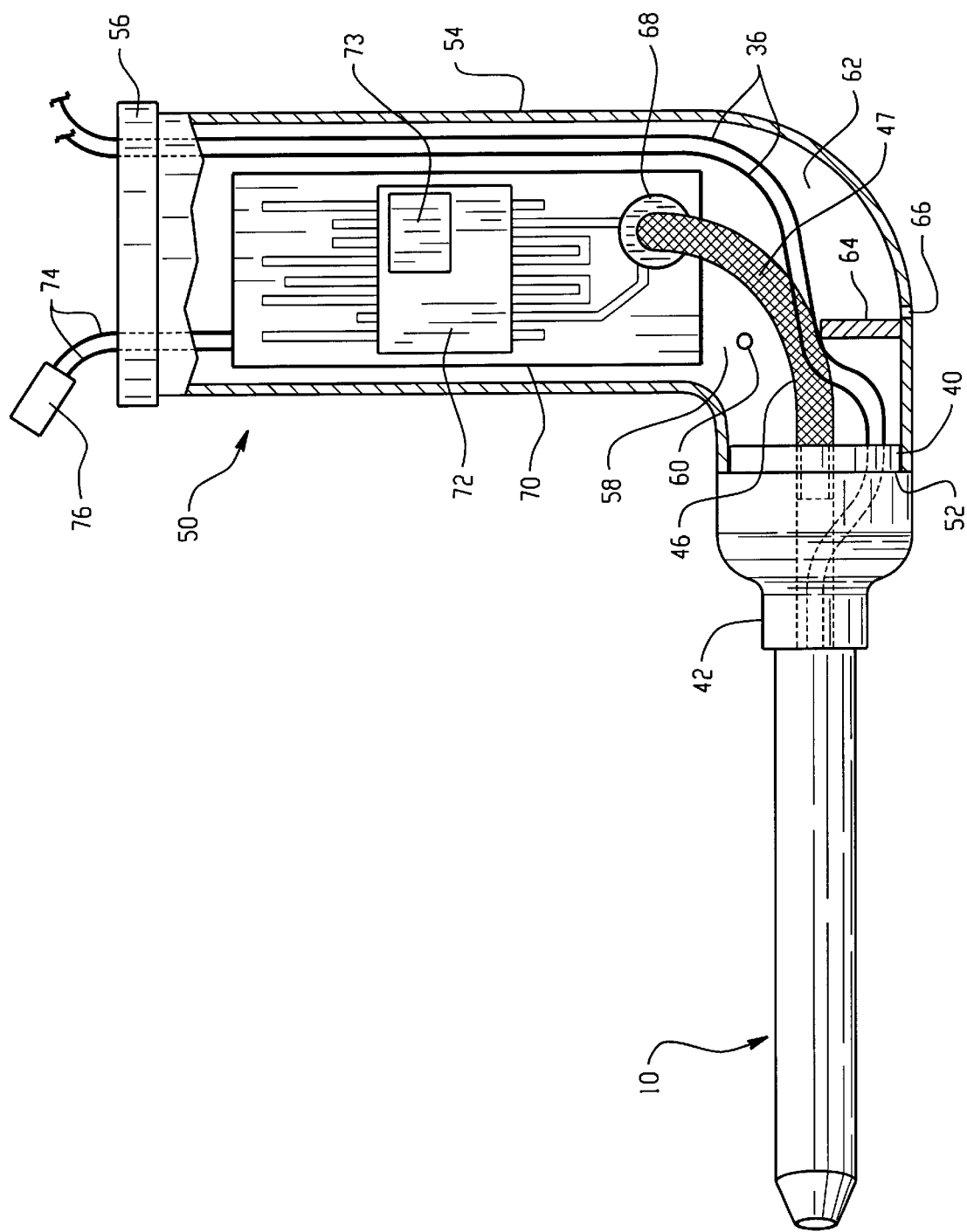

INTEGRAL ELECTRIC PRESSURE PROBE FOR AIRCRAFT

BACKGROUND OF THE INVENTION

The present invention relates to aircraft pressure probes, in general, and more particularly, to a pressure probe including a pitot tube assembly mounted to a surface of an aircraft by a strut, and a pressure sensor and signal conditioning circuitry integral to the strut for converting the pressure collected by the pitot tube assembly to an electrical pressure signal.

Total pressure and/or static pressure of air surrounding a surface of an aircraft is (are) generally collected by a pitot tube assembly mounted to the aircraft surface for use in calculating air speed and altitude among other parameters. Currently, the pitot tube assembly is mounted to the surface of the aircraft using a metal strut. Because of the extremely low temperatures encountered at the aircraft surface, especially during flight at high altitudes, a heating element is included in the pitot tube assembly for preventing ice from forming on and in the assembly which could adversely affect the pressure collection thereof. Accordingly, heat from the assembly is conducted to the metal strut which could attain temperatures on the order of 300° F., for example, at still air conditions.

Most pressure probes of the aforementioned type conduct the pressure collected thereby through pneumatic tubing to a central location on the aircraft, like the cockpit, for example, where an electronic air data processor may be located for converting the pneumatic pressure to an electrical signal and calculating the desired parameter(s) therefrom. Assembling this pneumatic tubing through the aircraft is cumbersome, costly and adds weight to the craft. Maintaining the tubing is also no easy task. Accordingly, it is desirable to eliminate this pneumatic tubing in modem aircraft if at all possible.

Recently, Rosemount Aerospace Inc. d.b.a. BFGoodrich Aerospace Sensors began marketing a aircraft pressure probe under the tradename Smart Probe™ in which a box of electronics is disposed on the aircraft in close proximity to the pressure probe for converting the pneumatic pressure to an electrical signal and calculating the desired parameter(s) therefrom which are then conducted through electrical conductors to drive instruments in the cockpit for use by the pilot. While this solution eliminated the pneumatic tubing as desired, the added electronics for each pressure probe raises the cost thereof rendering these probes affordable to only a select few.

The present invention comprises an aircraft pressure probe which eliminates the pneumatic tubing of the current probes providing for easier and less expensive assembly and maintenance on the aircraft as well as removing weight. Also, as a result of improved manufacturing techniques, the inventive pressure probe may be rendered as affordable as the current pressure probes.

SUMMARY OF THE INVENTION

In accordance with one aspect of the present invention, an electric pressure probe for an aircraft comprises: a pitot tube assembly for collecting pneumatically air pressure in the vicinity of said assembly; a strut including one end mountable to a surface of the aircraft, said pitot tube assembly being coupled to another end of said strut for being supported away from said aircraft surface; a pressure sensor integral to said strut and pneumatically coupled to said pitot tube assembly for converting the pneumatic pressure collected thereby to an electrical pressure signal; and circuitry integral to said strut and coupled to said pressure sensor for signal conditioning said electrical pressure signal, said circuitry including at least one output lead for conducting said conditioned electrical signal from said probe.

In accordance with another aspect of the present invention, a method of making an integral electric pressure probe comprises the steps of coupling one end of a housing to a pitot tube assembly; molding a moldable material into the form of a strut including one end for being mounted to a surface of an aircraft; and molding another end of the housing to another end of the strut.

BRIEF DESCRIPTION OF THE DRAWINGS

FIG. 1 is a sketch of a pitot tube assembly suitable for use in an embodiment of the present invention.

FIG. 2 is a sketch of a mechanical coupling of a pitot tube assembly to a strut for use in an embodiment of the present invention.

FIG. 3 is a sketch of an integral electric pressure probe suitable for embodying the principles of the present invention.

DETAILED DESCRIPTION OF THE INVENTION

The term "electric pressure probe" as used herein for describing the embodiments of the present invention shall mean a pressure probe which produces at least one electrical signal representative of pressure(s) measured by the probe. Also, the term "material lacking substantially in heat conduction" as used herein shall mean the material is thermally isolated.

Referring to FIG. 1, a sketch of a suitable pitot tube assembly 10 for use in an exemplary electric pressure probe embodiment is shown in cross-sectional perspective. The assembly 10 includes an outer hollow cylindrically shaped tube 12 which may be on the order of three inches long (approximately 7.5 centimeters) with an outside diameter dimension of 0.3 to 0.4 inches (approximately 0.75 to 1.0 centimeter), for example. The tube 12 may be made of a material substantially impervious to the environment with high heat conduction properties, like stainless steel or aluminum, for example. The tube 12 has a frustoconically shaped front end 14 which has an opening 16 at the tip for receiving air flow therein. Another cylindrically shaped, hollow tube 18 is disposed within the hollow outer tube 12 and has a closed, blunt face 20 in proximity to the opening 16 for blocking any water and particulates in the air received by the opening 16 from entering the tube 18. The length of tube 18 is slightly less than tube 12 and may have an outside diameter dimension on the order of 0.1 to 0.125 inches (approximately 0.25 to 0.32 centimeters), for example. An opening 22 is provided on a side of the tube 18 in proximity to the face 20 thereof for passing air received through opening 16 to the hollow interior of tube 18. The tube 18 may be also made of a material with high heat conduction properties, like aluminum or Beryllium copper, for example.

A conventional water trap stop 24 is disposed around the periphery of the tube 18 in a ring-like fashion at a suitable point along the length of tube 18 and makes contact with the inner surface of the tube 12 which is secured to and supported in place by the trap stop 24. The trap stop 24 may be made of a material with high heat conduction properties like, Aluminum or Beryllium copper, for example. A water drain opening 26 is provided through the tube 12 just upstream of the water trap stop 24. A third cylindrically shaped, hollow tube 30 which may be made of ceramic or like material is disposed inside the tube 18 and has an outside diameter dimension large enough to make contact with the inside surface of the tube 18. An opening 32 is provided at the front face of tube 30 to receive the air from opening 22. A heating element 34 is included in the pitot assembly 10 and for the present embodiment, comprises a heater wire affixed to the outer surface of tube 30 in a serpentine fashion to cover substantially the overall area thereof. In the alternative, the heating element 34 may comprise metalized heater traces deposited on the surface of the ceramic tube 30 in a similar serpentine fashion, for example. Power may be provided to the heating element 34 through a pair of lead wires 36.

The back end 38 of assembly 10 may be coupled to one end of a housing 40 which may be made of a brass material and covered with a material lacking substantially in heat conduction, like a polycarbonate or similar polymeric material, for example. A securing element 42, like a retaining ring, for example, (not shown) may secure the assembly 10 to the housing 40. The interface of this coupling will be described in greater detail herein below in connection with an embodiment thereof depicted in FIG. 2. The housing 40 includes an opening 44 through its center which acts as a conduit for the heater leads 36 and a flexible tubing 46 which is attached at one end to the opening 44 to permit a pneumatic coupling with the inner tube 30. The tubing 46 may be made of a flexible, electrically non-conductive material such as a Silicon, for example. In addition, to provide a support structure for the leads 36 and tubing 46 in the opening 44, an electrically and thermally non-conductive material, like a Silicon gel like material, for example, may be used.

Referring to FIG. 2, at the back end 38 of the pitot assembly 10, the outer tube 12 is flanged over a curved surface at the front end of the housing 40 which is contoured to accept the flanged outer tube 12. The securing element or retaining ring 42 which may be made of a brass material, for example, is fitted over the pitot tube assembly 10 and secured to the housing 40. In the present embodiment, an inner surface of the ring 42 includes threads 43 formed therein and a portion of the outer surface of the housing 40 includes threads 45 formed therein so that the retaining ring 42 may be screwed onto the housing 40 and secured thereto. In this process of securing the ring 42 to the housing 40, the ring 42 mechanically forces the flanged surface outer tube 12 at 38 against the curved contour of the housing 40, thus securing the pitot tube assembly 10 to the housing 40. While the method of securing in the present embodiment comprises screwing the ring to the housing, it is understood that other securing techniques may be used just as well. For example, the retaining ring 42 may be secured by a rotary swaging process or even an electrical tap welding process, if the metals are compatible.

In operation, air at the surface of the aircraft is received though opening 16 of the pitot tube assembly 10. Any water particles and/or ice formation or other particulates in the received air strike the surface 20 of the tube 18 and fall into a trap area 48 at the bottom inner surface of the tube 12. The trap stop 24 prevents the water, ice and particulates from flowing to the housing 40. Any unevaporated water or ice and particulates may flow out of the trap area 48 through the drain opening 26 to avoid a build up thereof within the hollow portion of tube 12. The received air is passed through openings 22 and 32 and into the hollow portion of tube 30 wherein the pressure thereof is collected. This pressure is pneumatically conducted from the tube 30 through the flexible tubing 46 via housing 40 to a pressure sensor which will become more evident from the description found herein below. Power is provided to the heating element 34 through leads 36 to heat the tube 30 starting at the outer surface thereof. Heat from tube 30 is conducted to tube 18 through the surface to surface contact therebetween. Heat from tube 18 is conducted to tube 12 through contact with the trap stop 24. Accordingly, the power conducted to the heating element 34 from leads 36 ultimately heats all of the assembly 10 to prevent ice from forming in and on the tubes thereof which ice, if left to form, could adversely affect the pressure collection in the assembly 10. Note that the heat transfer stops substantially at the assembly 10 because the housing 40, tubing 46 and retaining ring 42 all comprise a covering material lacking substantially in heat conduction as will become more evident from the description below.

In FIG. 3 is a sketch of an integral electric pressure probe 50 suitable for embodying the principles of the present invention. Referring to FIG. 3, the pitot tube assembly 10 may be coupled to the one end of the housing 40 utilizing the securing element 42 as described in connection with the embodiments of FIGS. 1 and 2, for example. As shown in more specific detail in FIGS. 1 and 2, the other end of housing 40 may be coupled at an interface 52 to a strut 54 which may be made of a moldable material lacking substantially in heat conduction, like a polycarbonate or other similar polymeric material, for example. This coupling may comprise an insertion molding process, for example, as will become more evident from the description below. In the present embodiment, the strut 54 is hollow inside with a wall thickness on the order of 0.080 inches (approximately 2 mm), for example. At the top or bulkhead section 56 of the strut 54, the wall thickness may be substantially thicker to provide greater support. The bulkhead 56 is configured to fit up into an opening in the surface of the aircraft, like under the wing or at the nose section, for example. Screw holes may be provided around the circumference of the bulkhead section 56 to mount the strut 54 with screws to the surface of the aircraft. While screws are one way of mounting the strut to the aircraft, it is understood that other ways of mounting may be employed without deviating from the broad principles of the present invention. The strut 54 thus supports the pitot tube assembly 10 a desired distance away from the mounting surface of the aircraft.

A static pressure chamber 58 may be formed within the hollow cavity of the strut 54. At least one opening 60 is provided through a wall of the strut 54 in the vicinity of the chamber 58 to permit passage of outside air therein. Water and other particulates in the air may be collected in a trap area 62 of the hollow portion of the strut 54. A trap stop 64 is disposed in the trap area 62 to prevent water or ice and particulates from flowing into the housing 40. In addition, at least one drain opening 66 is provided through the wall of the strut 54 in proximity to the trap 64 to permit drainage of the water from the trap area 62 to avoid any build up thereof.

Still referring to FIG. 3, the flexible tubing 46 which may be covered with a metal braiding 47 (see also FIG. 2) which may be stainless steel, for example, to give it better rigidity so it does not flap around and break loose within the strut 54 is coupled to a pressure sensor 68 to conduct pneumatically the pressure of the tube 30 to the sensor 68. In the present embodiment, the pressure sensor 68 is a solid-state pressure sensor (SSPS) of the strain gauge variety fabricated on a printed circuit (PC) card 70 which may be mounted within and made integral to the strut 70. The SSPS 68 may sense the pressure of the tube 46 and convert it into a first electrical signal representative of a total pressure measurement, or it may sense both the pressure of the tube 46 and the pressure of the chamber 58 and convert them into a second electrical signal representative of a static pressure measurement, or it may produce both the first and second electrical signals. Signal conditioning circuitry 72 is also disposed on the PC card 70 coupled to the pressure sensor 68 for signal conditioning the first electrical signal or second electrical signal or both. The signal conditioning circuitry 72 may include at least on output lead 74 for conducting the conditioned electrical pressure signal(s) from the probe 50 to aircraft wiring, for example, via a conventional electrical connector 76. An embodiment of a suitable SSPS and corresponding signal conditioning circuitry is described in the U.S. Patent Application entitled "System and Method of Determining An Altitude of An Aircraft Using Barometric Pressure Measurements", bearing application Ser. No. 09/734,363 and filed on Dec. 11, 2000, and assigned to the same assignee as the instant application. This application Ser. No. 09/734,363 is incorporated by reference herein for providing by way of example an SSPS and associated signal conditioning circuitry in greater detail. Heater leads 36 may also pass through the strut 54 for connection to an aircraft power source, for example. In addition, the conditioning circuitry 72 may include circuitry 73 for digitizing the electrical pressure signal(s) for conduction over the lead(s) 74 in digital form.

In an alternate embodiment, the PC card 70 containing the pressure sensor 68 and signal conditioning circuitry 72 is rendered integral to the strut 54 through a molding process, for example. The tubing 46 and heater leads 36 may also be made integral to the strut 46 by the molding process. This process of rendering the PC card 70, tubing 46 and leads 36 integral to the strut 54 may be accomplished during the molding process of the strut itself. In fact, the coupling of the strut 54 to the housing 40 at the interface 52 may be performed by insertion molding either during the molding process of the strut 54 or thereafter. In this molding process, the housing 40 and ring 42 may be covered with a molding material that is lacking substantially in heat conduction, like a polycarbonate, for example. In this manner, a barrier to heat transfer from the pitot tube assembly 10 to the strut 54 is created at interface 52.

A method of making the electric pressure probe 50, by way of example, comprises the steps of: coupling one end of the housing 40 to the pitot tube assembly 10; molding a moldable material into the form of the strut 54 including one end 56 for being mounted to a surface of an aircraft; and molding the other end of the housing 40 at interface 52 to another end of the strut 54. Preferably, the step of molding the housing to the strut may be performed during the step of molding the strut 40. The pressure sensor 68 and signal conditioning circuitry 72 may be molded to the strut 54 to render them integral thereto. Preferably, the steps of molding the pressure sensor and molding the signal conditioning circuitry to the strut 54 are performed during the step of molding the strut 54.

An exemplary molding process may include inserting the housing 40 and ring 42 portion of the assembly 10 into a molding form of the strut 54 at the interface 52, positioning the PC card 70 at a wall area of the molding form so that the pressure sensor 68 thereof is in the vicinity of the chamber 58, attaching the tubing 46 to opening 44 in the housing 40 and to the pressure sensor 68 in the molding form and positioning the tubing at the wall area of the form, positioning the leads 36 via opening 44 along a wall area of the form and allowing them to exit the form at the bulkhead area 56, and positioning the output lead(s) 74 of the PC card 70 along a wall of the form and allowing the connector 76 to hang over the outside of the form at the bulkhead area thereof. The PC card 70 may be of the flexible variety for configuring it to the contour or curvature of the strut wall. Once all of the elements are positioned in place within the molding form, the molding material, which may be a polycarbonate, for example, is injected into the molding form to flow along the walls to the thickness desired, to flow around and cover the housing 40, retaining ring 42, and interface 52, and to flow around and encapsulate the previously positioned elements within the form. The form is then pressurized and heated to a desired pressure and temperature and cured for a predetermined time period. Thereafter, the form is depressurized and cooled to complete the molding process which renders a fully integral electric pressure probe 50 through a single molding step.

While the strut 54 has been described herein above as comprising a material lacking substantially in heat conduction, it is understood that in some applications, the strut 54 may be made of a metallic material in which case, the pressure sensor and associated electronics of the PC card 70 would be insulated from the metal strut 54 with a material lacking substantially in heat conduction to protect the sensor and electronics from the high temperatures of the metal strut 54 resulting from the heat conduction properties thereof.

While the present invention has been described herein above in connection with a number of embodiments, it is understood that this was done merely by way of example. Accordingly, the present invention should not be limited in any way, shape, or form by the described embodiments, but rather construed in breadth and broad scope in accordance with the recitation of the appended claims hereto.

What is claimed is:

1. An electric pressure probe for an aircraft, said probe comprising:

a pitot tube assembly for collecting pneumatically air pressure in the vicinity of said assembly;

a strut including one end mountable to a surface of the aircraft, said pitot tube assembly being coupled to another end of said strut for being supported away from said aircraft surface;

a pressure sensor integral to said strut and pneumatically coupled to said pitot tube assembly for converting the pneumatic pressure collected thereby to an electrical pressure signal; and circuitry integral to said strut and coupled to said pressure sensor for signal conditioning said electrical pressure signal, said circuitry including at least one output lead for conducting said conditioned electrical signal from said probe.

2. The probe of claim 1 wherein the pitot tube assembly includes an electric heating element and at least one heater lead coupled to said heating element for supplying a power signal thereto, said at least one heater lead extending to and integral with the strut.

3. The probe of claim 1 wherein the pitot tube assembly includes tubing extending therefrom for coupling the collected pneumatic pressure to the pressure sensor, said tubing made of a material lacking substantially in heat conduction.

4. The probe of claim 3 wherein said tubing being integral to said strut.

5. The probe of claim 3 wherein said tubing comprises Silicon and includes an outer sleeve of metal braiding.

6. The probe of claim 1 wherein said strut is made of a moldable material lacking substantially in heat conduction.

7. The probe of claim 6 wherein the pressure sensor, and signal conditioning circuitry coupled thereto are molded into a wall of the strut during a molding process to render them integral to the strut.

8. The probe of claim 6 wherein the pitot tube assembly includes tubing extending therefrom for coupling the collected pneumatic pressure to the pressure sensor, said tubing being molded into a wall of the strut to render it integral to the strut.

9. The probe of claim 6 including a housing moldably inserted between the pitot tube assembly and the strut.

10. The probe of claim 1 including a housing for coupling the pitot tube assembly to the strut, said housing comprising a material lacking substantially in heat conduction.

11. The probe of claim 1 wherein the pressure sensor converts the pneumatic pressure of the pitot tube assembly to an electrical signal representative of a total pressure measurement.

12. The probe of claim 1 wherein the strut includes a chamber and at least one air passageway through the strut between the chamber and external air, pressure of the strut chamber being measurable by the pressure sensor; and wherein the pressure sensor converts the pressures of the pitot tube assembly and the chamber into a first electrical signal representative of a static pressure measurement.

13. The probe of claim 12 wherein the pressure sensor also converts the pneumatic pressure of the pitot tube assembly to a second electrical signal representative of a total pressure measurement.

14. The probe of claim 12 wherein the strut includes a water trap in the chamber thereof.

15. The probe of claim 1 wherein the circuitry including circuitry for digitizing the electrical signal for conduction over the at least one output lead in digital form.

16. The probe of claim 1 wherein the strut is made of a material substantially lacking in heat conduction.

17. The probe of claim 1 wherein the strut is made of a metallic material and the pressure sensor and signal conditioning circuitry is insulated from the metallic strut by a material lacking substantially in heat conduction.

* * * * *